United States Patent
Chen et al.

(10) Patent No.: US 10,540,273 B2
(45) Date of Patent: Jan. 21, 2020

(54) SIMULATOR FOR SYSTEM TESTING

(71) Applicant: Visa International Service Association, San Francisco, CA (US)

(72) Inventors: Yuexi Chen, Foster City, CA (US); Ben Dominguez, San Bruno, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/475,634

(22) PCT Filed: Feb. 6, 2017

(86) PCT No.: PCT/US2017/016719
§ 371 (c)(1),
(2) Date: Jul. 2, 2019

(87) PCT Pub. No.: WO2018/144036
PCT Pub. Date: Aug. 9, 2018

(65) Prior Publication Data
US 2019/0347189 A1    Nov. 14, 2019

(51) Int. Cl.
*G06F 11/00*    (2006.01)
*G06F 11/36*    (2006.01)
*G06Q 20/34*    (2012.01)
*G06F 17/50*    (2006.01)

(52) U.S. Cl.
CPC ...... *G06F 11/3692* (2013.01); *G06F 11/3688* (2013.01); *G06F 17/5009* (2013.01); *G06Q 20/341* (2013.01); *G06Q 20/352* (2013.01)

(58) Field of Classification Search
CPC .............. G06F 11/261; G06F 11/3457; G06F 11/3688; G06F 11/3692
See application file for complete search history.

(56) References Cited

U.S. PATENT DOCUMENTS

| | | | |
|---|---|---|---|
| 9,110,496 B1 * | 8/2015 | Michelsen | G06F 1/00 |
| 9,117,177 B1 * | 8/2015 | Carr | G06N 3/08 |
| 10,289,539 B1 * | 5/2019 | Arguelles | G06F 11/3692 |
| 10,394,583 B2 * | 8/2019 | Lau | G06F 11/3466 |
| 2005/0097015 A1 | 5/2005 | Wilkes et al. | |
| 2005/0223281 A1 * | 10/2005 | Maly | G06F 11/073 714/20 |
| 2006/0224919 A1 * | 10/2006 | McIver | G06F 11/3457 714/12 |
| 2009/0294526 A1 | 12/2009 | Maw | |
| 2009/0299680 A1 * | 12/2009 | Gibbs | G06F 11/3664 702/119 |
| 2011/0302451 A1 | 12/2011 | Smith et al. | |

(Continued)

OTHER PUBLICATIONS

PCT/US2017/016719, "International Search Report and Written Opinion", dated Nov. 29, 2017, 11 pages.

*Primary Examiner* — Joshua P Lottich
(74) *Attorney, Agent, or Firm* — Kilpatrick Townsend & Stockton

(57) ABSTRACT

A method for simulating a transaction device is disclosed. A simulation device can be loaded with a predefined set of output messages to send in response to certain input messages, the output messages simulating messages sent by a transaction device. The simulation device can simulate a properly functioning transaction device, as well as a malfunctioning transaction device.

20 Claims, 7 Drawing Sheets

(56) References Cited

U.S. PATENT DOCUMENTS

2013/0098984 A1    4/2013   Shenker et al.
2015/0363776 A1   12/2015   Gomez et al.
2017/0289008 A1* 10/2017   Lau ........................ H04L 43/14

* cited by examiner

SIMULATOR FOR SYSTEM TESTING

CROSS REFERENCE TO RELATED APPLICATIONS

This application is filed under 35 U.S.C. Section 371, which claims the benefit of the filing date of PCT Patent Application No. PCT/US2017/016719 filed Feb. 6, 2017, which is herein incorporated by reference in its entirety for all purposes.

BACKGROUND

There are many types of transaction devices, and each transaction device provides different pieces of information when conducting a transaction. Additionally, the same transaction device may provide different types of information during different transaction scenarios. For example, physical contact-based transactions may involve different communications than contactless communication-based transactions.

It is often desirable to make sure that an access device can correctly process transactions for each type of transaction device and each transaction scenario. This can mean running hundreds or even thousands of test transactions at the access device to ensure total compatibility. Typically a different transaction device with a specific logic and configuration is used for each test transaction.

This presents a problem, as it is costly to create and distribute a batch of test transaction devices to each remotely located access device. Additionally, it is difficult to identify error trends on a global scale, as each transaction is conducted separately in a remote location. Further, a skilled technical operator is needed to manually run each test and make sure everything is working properly.

Embodiments of the invention address these and other problems individually and collectively.

SUMMARY

Embodiments of the invention are directed to a simulation device that simulates different transaction devices and transaction scenarios. The simulation device can replace an entire batch of test transaction devices by simulating the functionality of each transaction device, thereby reducing the cost of generating and distributing a batch of devices. Further, the simulation device may not need to incorporate the actual logic and programming of a transaction device, thereby simplifying the creation of test transactions and reducing the exposure of card logic. Instead, the simulation device can include, for each test transaction, a set of predefined input messages that are mapped to a set of predefined output messages designed to simulate an output from a specific transaction device.

Embodiments of the invention further provide a simulation device that can simulate a malfunctioning transaction device. The simulation device can send messages with incorrect information, bad formatting, or any other suitable error. As a result, the simulation device can test how a computing device, as well as other components in a transaction system, react to a malfunctioning transaction device.

In some embodiments, the simulation device can be remotely loaded with test transaction instructions, and thereby be updated even when in the field. Also, the simulation device can automatically run test transactions and then report any results back to a central computer or testing facility, thereby eliminating the need for a skilled technical operator.

One embodiment of the invention is directed to a method. The method comprises engaging in a transaction communication session with a computing device in order to observe how a transaction system reacts to a specific transaction scenario. The simulation device stores instructions for a test transaction. The instructions include a set of predefined output messages and predefined input messages configured to simulate the specific transaction scenario. The method also includes receiving a transaction input message from the computing device, determining that the transaction input message matches a predefined input message, and identifying a predefined output message based on the matched predefined input message. The method further comprises sending the predefined output message to the computing device. A transaction report is generated that indicates how the computing device reacted to the specific transaction scenario.

Another embodiment of the invention is directed to a simulation device configured to perform the above-described method.

Another embodiment of the invention is directed to a method comprising engaging in a transaction communication session with a simulation device and sending a transaction input message to the simulation device. The simulation device determines that the transaction input message matches a predefined input message, and the simulation device identifies and transmits a predefined output message based on the matched predefined input message. The method also includes receiving the predefined output message from the simulation device. The predefined output message is a part of a set of predefined output messages configured to simulate a specific transaction scenario. The method further comprises processing the transaction based on the received predefined output message. A transaction report is generated that indicates how the computing device reacted to the specific transaction scenario.

Another embodiment of the invention is directed to a computing device configured to perform the above-described method.

Further details regarding embodiments of the invention can be found in the Detailed Description and the Figures.

DETAILED DESCRIPTION

Figure 1:
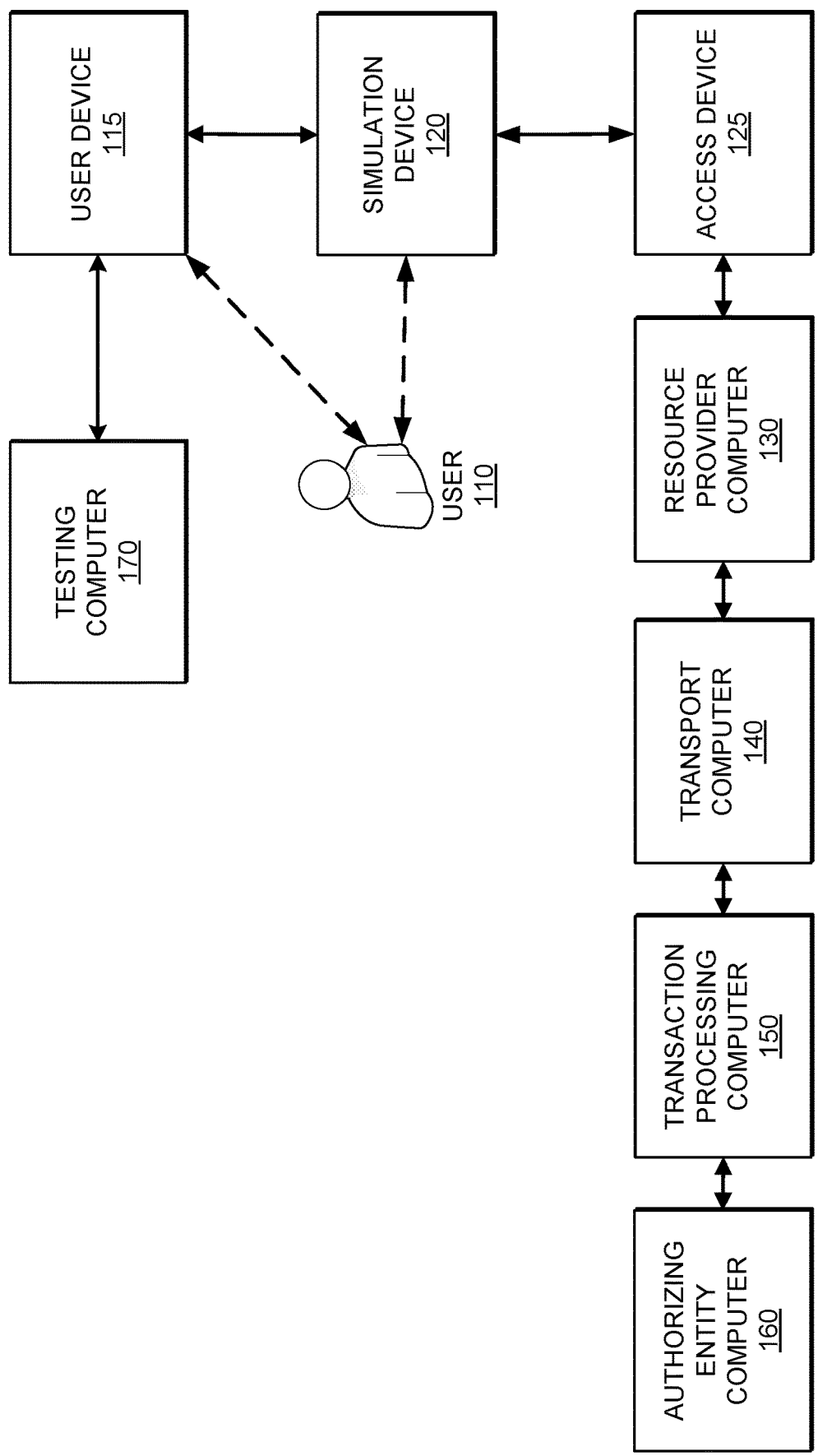
FIG. 1 shows a block diagram of a system according to an embodiment of the invention.

Embodiments of the present invention are directed to a simulation device for simulating a transaction device. The simulation device can interact with an access device to conduct a transaction, sending communications that mimic communications that could be sent by a transaction device. The simulation device can simulate the functionality of one or more types of transaction devices, as well as one or more types of transaction scenarios.

The simulation device can test how an access device acts when one or more transaction devices are used to conduct a transaction. In some embodiments, the simulation device can be remotely loaded with instructions for one or more test transactions. Accordingly, the simulation device can replace an entire batch of special test cards, as well as future updated test cards. Thus, efficiency (e.g., cost and time) is improved for testing an access device's reaction to different transaction devices and scenarios.

Additionally, the simulation device can record information about how an access device and transaction system behave during a test transaction. This data can be provided to a central testing computer or testing facility and analyzed to determine trends and/or systemic issues. This improves trouble shooting and trend recognition.

In some embodiments, the simulation device can simulate a specific transaction device without having the logic and programming that characterizes that specific transaction device. Instead, the simulation device can be loaded with a set of predefined output messages that are the same as or similar to messages that would be sent by the transaction device being simulated. The simulation device can also have a set of predefined input messages. When an access device sends a message to the simulation device, the simulation device can identify a matching predefined input message. The simulation device can determine what predefined output message corresponds to the matched input message, and then send the predefined output message as a response back to the access device. As a result, confidential and/or security sensitive card logic can be protected from exposure, and the process for creating test transaction instructions is simplified.

Embodiments of the invention further enable the simulation device to simulate a malfunctioning transaction device. The simulation device can be programmed to send the wrong type of output message, or a transaction message with the wrong data, missing data, or incorrectly formatted data. As a result, the simulation device can test how an access device reacts to a faulty transaction device, and determine whether the access device behaves as desired in that situation. Further, this type of a negative test case can be simulated using predefined output messages, as explained above. This improves efficiency and reduces workload, as otherwise the foundational card logic would need to be changed to create this type of negative test case.

Prior to discussing specific embodiments of the invention, some terms may be described in detail.

A "simulation device" may include an apparatus that can imitate another device. For example, a simulation device can perform the messaging or other interactions that may typically be performed by another device in the same situation. In some embodiments, a simulation device can appear to function as another device, but may not perform the same internal processes as the simulated device. In some embodiments, a simulation device can simulate multiple types of devices (e.g., payment devices, mobile devices, identity verification devices, etc.).

A "transaction device" may include an apparatus that can interact with another device. For example, a transaction device can interact with an access device in order to conduct a transaction. A transaction device may provide information to the access device in order to pay for a transaction, identify a user, gain access to an area (whether physical or virtual) or protected information, identify or obtain a service or product, or for any other suitable type of transaction. Examples of transaction devices include payment devices, membership devices, access cards, identification devices, and mobile devices.

A "transaction input message" may be a communication received during an interaction. For example, a message sent by an access device may be a transaction input message for a receiving transaction device. One example of a transaction input message is an APDU (application protocol data unit) command.

A "transaction output message" may be a communication sent during an interaction. One example of a transaction output message is an APDU (application protocol data unit) response sent by a transaction device.

A "test transaction" may be an investigative interaction. A test transaction may be conducted to find out information about how a transaction system is functioning. For example, different test transactions can be designed to determine whether or not a transactions will be processed correctly when initiated by different types of transaction devices. A test transaction can involve sending certain types of information during a transaction communication session in order to test how the information is processed. Some test transactions can be designed to check for flaws, and to check the response of an access device or transaction system when a transaction device provides incorrect information for a transaction.

In some embodiments, a test transaction can be completed by executing a set of instructions. A set of instructions can include a set of predefined output messages associated with a set of predefined input message. A "predefined output message" can be an outgoing communication that has been preconfigured or preloaded. A set of predefined output messages may be a list of potential messages for sending. A "predefined input message" can be a known communication that could be received. A set of predefined input messages may be a list of messages that could be received. During a test transaction, when a certain input message is received, a corresponding output message can be sent in response. In other embodiments, instead of sending a predefined message, a new message can be generated. For example, application logic and stored account information can be used to generate a new message based on information received in a command message.

A "transaction report" may include information related to an interaction. A transaction report can have a description of how the transaction was processed, such as information that was sent and received, and whether the transaction was successful. A transaction report can also include notes about problems, missing information, delays, or other issues that took place during a transaction.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a user device 115 and a simulation device 120 operated by a user 110. The system 100 further comprises a resource provider computer 130, a transport computer 140, a transaction processing computer 150, an authorizing entity computer 160, and a testing computer 170, each of which may be embodied by one or more computers. The simulation device 120 may be in communication with an access device 125, which may in turn be in communication with the resource provider computer 130. Also, the simulation device 120, the user device 115, the access device 125, the resource provider computer 130, the transport computer 140, the transaction processing computer 150, the authorizing entity computer 160, and the testing computer 170 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

In some embodiments, the system 100 can be a transaction system. In other words, a transaction can be initiated, processed, and approved using the components in the system 100. For example, the simulation device 120 can initiate a transaction by interacting with the access device 125 (e.g., by establishing contact or contactless communication). The access device 125 and simulation device 120 exchange one or more messages, such that the access device 125 can obtain transaction data from the simulation device 120. The access device 125 can provide the transaction data to the resource provider computer 130. The resource provider computer 130 can then send an authorization request message with the transaction data to the authorizing entity computer 160. This request can be routed through the transport computer 140 and the transaction processing computer 150. The authorizing entity computer 160 can authorize the transaction and return an authorization response message to the resource provider computer 130 and access device 125.

The resource provider computer 130 may be associated with a resource provider, which may be an entity that can provide a resource such as goods, services, information, and/or access. Examples of a resource provider include merchants, access devices, secure data access points, etc. A merchant may typically be an entity that engages in transactions and can sell goods or services, or provide access to goods or services.

The resource provider may accept multiple forms of payment (e.g., a payment card or a mobile device) and may use multiple tools to conduct different types of transactions. For example, the resource provider may operate a physical store and use the access device 125 for in-person transactions.

An access device 125 may be any suitable device for communicating with a resource provider and for interacting with a transaction device. An access device 125 can be in any suitable location such as at the same location as a merchant, and an access device 125 may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. Typically, an access device 125 may use any suitable contact or contactless mode of operation to send or receive data from a transaction device.

Figure 2:
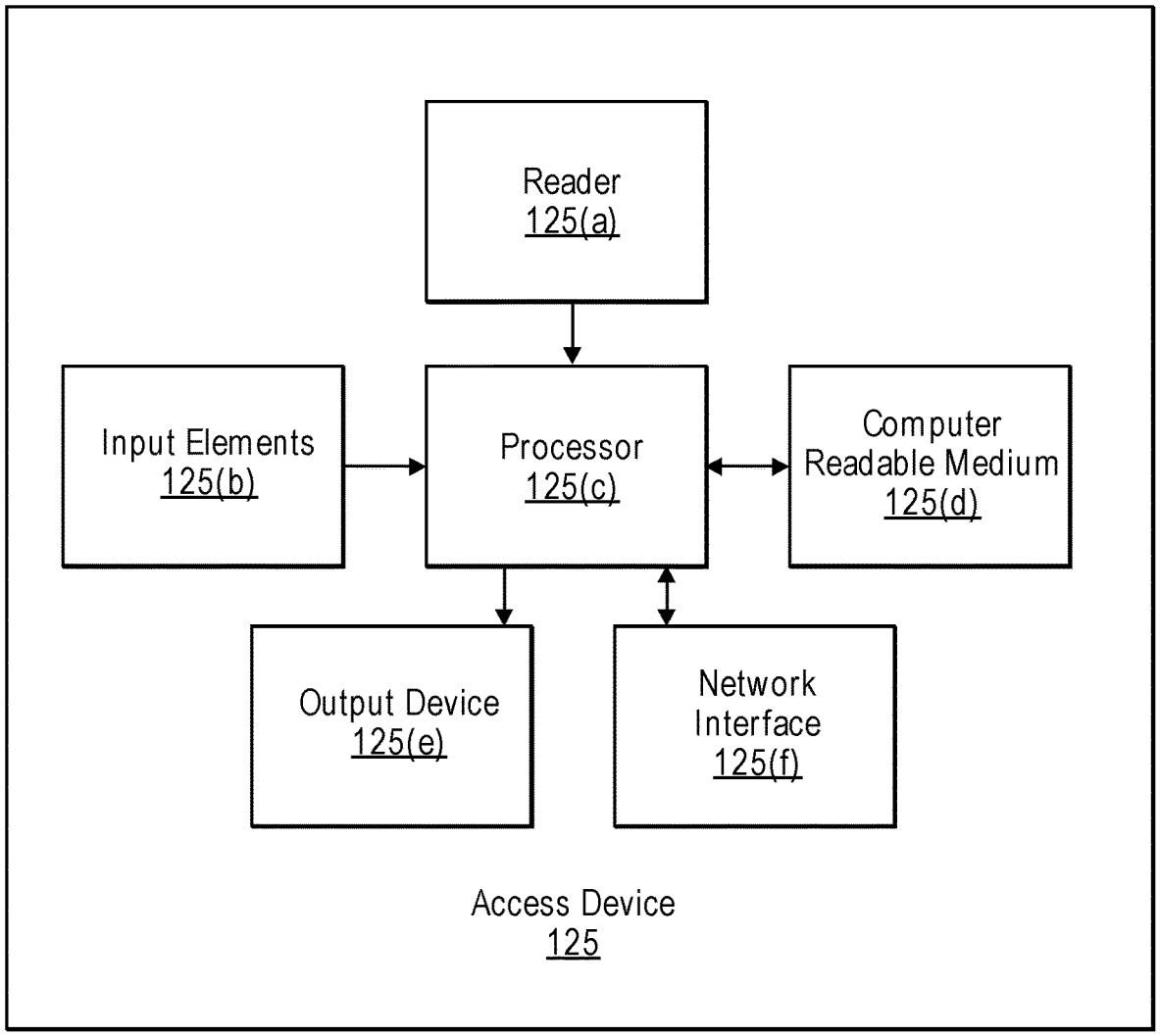
FIG. 2 shows a block diagram of an exemplary access device according to an embodiment of the invention.

An example of the access device 125, according to some embodiments of the invention, is shown in FIG. 2. The access device 125 may comprise a processor 125(c) operatively coupled to a computer readable medium 125(d) (e.g., one or more memory chips, etc.), input elements 125(b) such as buttons or the like, one or more readers 125(a) (e.g., a contact chip reader, a contactless reader, a magnetic stripe reader, etc.), an output device 125(e) (e.g., a display, a speaker, etc.) and a network interface 125(f). A housing may house one or more of these components.

The computer readable medium 125(d) may comprise instructions or code, executable by a processor. The instructions may include instructions for sending a command to a transaction device (or simulation device) upon making contact with that device, and instructions for communicating with the transaction device to obtain credentials and otherwise process a transaction. The computer readable medium 125(d) may also include instructions for authorizing a transaction with the authorizing entity computer 160, and instructions for any other suitable function as described herein.

Referring back to FIG. 1, the transport computer 140 may be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers. The transport computer 140 may be more specifically referred to as an acquirer computer.

The transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 150 may use any suitable wired or wireless network, including the Internet.

The authorizing entity computer 160 may be associated with an authorizing entity, which may be an entity that authorizes a request. An example of an authorizing entity may be an issuer, which may typically refer to a business entity (e.g., a bank) that maintains an account for a user. An issuer may also issue and manage a payment account associated with a transaction device.

The transaction processing computer 150, the transport computer 140, and the authorizing entity computer 160 may operate suitable routing tables to route authorization request messages and/or authorization response messages using payment credentials, merchant identifiers, or other account identifiers.

The testing computer 170 may generate, store, and/or provide information about different transaction devices and test transactions. For example, the testing computer 170 may host a set of instructions for each test transaction, the instructions including a set of predefined input messages and corresponding predefined output messages. The testing computer 170 may be regularly updated with new or different test transactions.

The testing computer 170 may distribute the test transaction information to one or more simulation devices 120. For example, the testing computer 170 may send (e.g., over-the-air) information about new test transactions, or instructions about which test transactions to execute. In some embodiments, the testing computer 170 may automatically update the instructions stored on the simulation device 120 (such as through a push functionality).

In some embodiments, the testing computer 170 may send the test transaction information to the simulation device 120 via the user device 115. For example, the simulation device 120 may not be able to communicate over-the-air, and the simulation device 120 may not be located near the testing computer 170 (and thus may not be able to establish a physical communication connection). Instead, the testing computer 170 may send the test transaction information to the user device 115. Then, the user device 115 can provide the test transaction information to the simulation device 120 by a physical communication connection (e.g., inserting the simulation device 120 into the user device 115), by short-range contactless communication, or through any other suitable means of communication.

Both the user device 115 and the simulation device 120 may be operated by the user 110. The user device 115 can be a mobile device, a laptop, desktop, wearable device, or any other suitable device.

As mentioned above, the simulation device 120 can simulate any suitable transaction device and/or transaction scenario. The below description will describe a scenario where the simulation device 120 is simulating a payment device and providing payment-related data to a merchant for a payment transaction. However, any other suitable type of device can be simulated, and any suitable type of information can be provided for any suitable type of transaction.

The simulation device 120 may receive and store instructions for conducting one or more test transactions. The instructions can include predefined input messages and output messages, such that the simulation device 120 can respond to a received input message with programmed output message. Accordingly, in some embodiments, the simulation device 120 may not need to generate a new output message, but can instead lookup an appropriate output message in a data table.

Embodiments allow the simulation device 120 to take any suitable form, such as a payment device or a mobile device. Also, the simulation device 120 may be able to communicate with the access device 125 via contact or contactless communication.

Different test transactions may be configured to test different transaction scenarios. For example, one test transaction may include instructions to send messages that simulate a normal transaction from a typical type of payment device (e.g., a Visa credit card). The test transaction may be designed to test whether or not the normal transaction is processed correctly. If an authorization response message is received at the access device 125 within a normal timeframe, the transaction system 100 may be considered to be functioning correctly. However, it is possible that the access device 125 or another component in the network is malfunctioning, and an error report may be received or the transaction rejected.

Another test transaction may simulate a malfunctioning payment device. For example, the simulation device 120 may send incorrect information, or may send information at the incorrect time. The test transaction may be run in order to observe how the access device 125 reacts to the malfunctioning payment device.

Transactions typically involve many messages, many forms of data exchange, and several components interacting in the transaction system. Accordingly, many test transactions can be designed that simulate different ways that a transaction device can malfunction, and/or that test how each component in the system handles different situations. The simulation device 120 can execute multiple transactions with the access device 125 in order to run on or more of the different test transactions.

The simulation device 120 can also receive a transaction report with details about the transaction. For example, the access device 125 can provide a transaction report that describes whether or not the transaction was successfully authorized, and that includes information about any processing errors or delays. In some embodiments, the transaction report may be typical information provided about authorization results.

The simulation device 120 may be able to display the transaction report to the user 110, thereby informing the user 110 as to the outcome of each test transaction as well as reasons for failure or other issues. The simulation device 120 can also provide the transaction report to the user device 115 and/or testing computer 170 (e.g., via a cellular network, the internet, LAN, WLAN, USB interface, or other physical or wireless interface) for further analysis.

Figure 3:
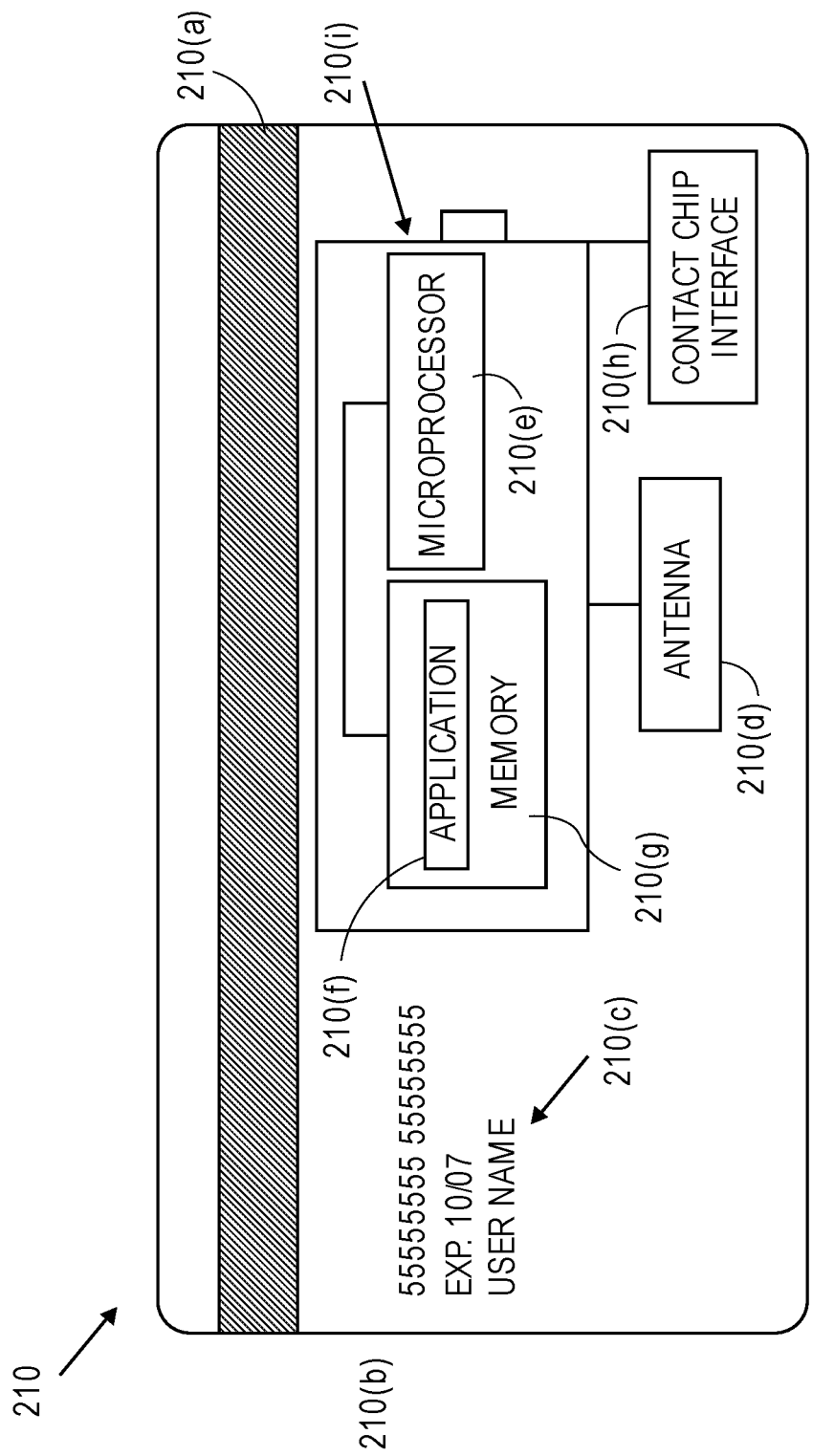
FIG. 3 shows a block diagram of an exemplary simulation device in the form of a card, according to an embodiment of the invention.

As mentioned above, the simulation device 120 can take several forms. An example illustration of a simulation device 120 in the form of a smartcard 210 is shown in FIG. 3. This smartcard 210 may simulate a payment card (e.g. a credit card, a debit card, or a prepaid card), an access card, an identification card, or any other suitable type of smartcard.

As shown in FIG. 3, the smartcard 210 may include a contact interface 210(*a*), such as a magnetic stripe and/or other contact means, such as a contact chip plate 210(*h*) capable of both reading and writing data stored within the memory 210(*g*) of the magnetic stripe of the card. In addition, the card may include a contactless interface, which in some embodiments may comprise an antenna 210(*d*) coupled to an integrated circuit chip 210(*i*) for wirelessly transmitting and receiving data stored on the card. It should be understood that the smartcard 210 may include any form of short range wireless communication capability. For example, the smartcard 210 can utilize RFID, Bluetooth™, infra-red, or other data transfer capability that can be used to exchange data between the smartcard 210 and an access device 125. In some embodiments an RF element may be used. In such embodiments, when the RF element is placed within an electric field generated by a POS terminal, the RF element may cause data associated with the contactless card (e.g., an account identifier or pre-programmed message) to be transmitted to the POS terminal.

In some embodiments, the smartcard 210 can include a printed, embossed, or otherwise displayed account identifier, expiration date 210(*b*), user name 210(*c*), and/or any other information associated with an account. This information could be associated with a testing account (which may or may not include real funds). Alternatively, a simulation device may not include these markings, and/or may display alternative information such as the phrase "test card."

The integrated circuit 210(*i*) can include a microprocessor 210(*e*) and a memory 210(*g*). The memory 210(*g*) can include one or more applications 210(*f*). An example application 210(*f*) is a simulation application. A simulation application can include instructions for conducting one or more test transactions, as well as information about the priority and ordering of the test transactions to be executed. As explained above, each test transaction can include a table of anticipated input messages and corresponding output messages to send in response. In some embodiments, the message tables for each test transaction can be stored in a test transaction database of the memory 210(*g*). The memory 210(*g*) can also store transaction reports with results for each test transaction.

Figure 4:
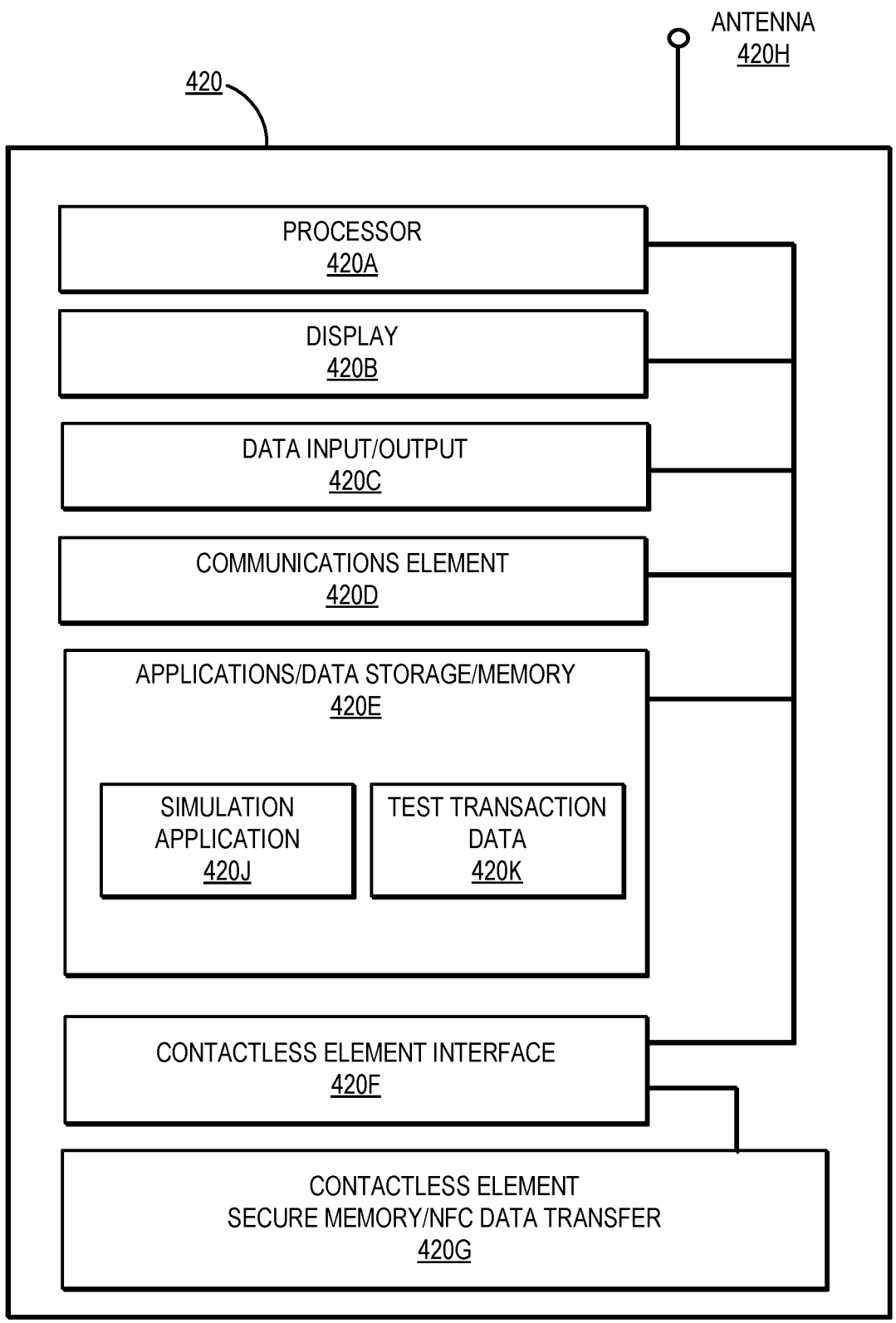
FIG. 4 shows a block diagram of an exemplary simulation device in the form of a mobile device according to an embodiment of the invention.

In other embodiments, the simulation device 120 can take the form of a mobile device. FIG. 4 shows an example illustration of a simulation device in the form of a mobile device 420, according to some embodiments of the invention.

The mobile device 420 may include circuitry that is used to enable certain device functions, such as telephony. The functional elements responsible for enabling those functions may include a processor 420A that can execute instructions that implement the functions and operations of the device. Processor 420A may access memory 420E (or another suitable data storage region or element) to retrieve instructions or data used in executing the instructions, such as mobile applications. Data input/output elements 420C, such as a keyboard or touchscreen, may be used to enable a user to operate the mobile device 420 and input data (e.g., user authentication data). Data input/output elements may also be configured to output data (via a speaker, for example). Display 420B may also be used to output data to a user. Communications element 420D may be used to enable data transfer between mobile device 420 and a wired or wireless network (via antenna 420H, for example) to assist in connectivity to the Internet or other network, and enabling data transfer functions. Mobile device 420 may also include contactless element interface 420F to enable data transfer between contactless element 420G and other elements of the device, where contactless element 420G may include a secure memory and a near field communications data transfer element (or another form of short range communications technology). As noted, a cellular phone or similar device is an example of a mobile device 420 that may be used in accordance with embodiments of the present invention. However, other forms or types of devices may be used without departing from the underlying concepts of the invention. For example, the mobile device 420 may alternatively be in the form of a key fob, a tablet computer, a wearable device, a vehicle such as a car, etc.

The memory 420E may comprise a simulation application 420J, test transaction data 420K, and any other suitable module or data. The mobile device 420 may have any number of mobile applications installed or stored on the memory 420E and is not limited to that shown in FIG. 4. The memory 420E may also comprise code, executable by the processor 420A for implementing a method comprising engaging in a transaction communication session with a computing device in order to observe how a transaction system reacts to a specific transaction scenario, the simulation device storing instructions for a test transaction, the instructions including a set of predefined output messages and predefined input messages configured to simulate the specific transaction scenario; receiving a transaction input message from the computing device; determining that the transaction input message matches a predefined input message; identifying a predefined output message based on the matched predefined input message; and sending the predefined output message to the computing device, wherein a transaction report is generated that indicates how the computing device reacted to the specific transaction scenario.

The simulation application 420J may allow the mobile device 420 to simulate one or more transaction devices and/or transaction scenarios. The simulation application 420J may be able to store and/or access test transaction data 420K. The simulation application 420J may be able to cause the mobile device 420 to activate a specific test transaction, receive an input message from an access device, identify a matching input message from a set of test transaction messages, select a corresponding output message, and send the output message to the access device. The simulation application 420J may also include instructions for storing reports about an executed test transaction, such as information about data that was received from the access device (including each message and/or a transaction report), as well as information about unusual activity.

The test transaction data 420K may include information for one or more test transactions. Each test transaction file can include a set of predefined input messages and a set of corresponding predefined output messages. Each test transaction may be configured to test a certain aspect of a transaction system, and/or the reaction of the access device to a certain set of messages (which may include inappropriate, missing, or disordered information).

Figure 5A:
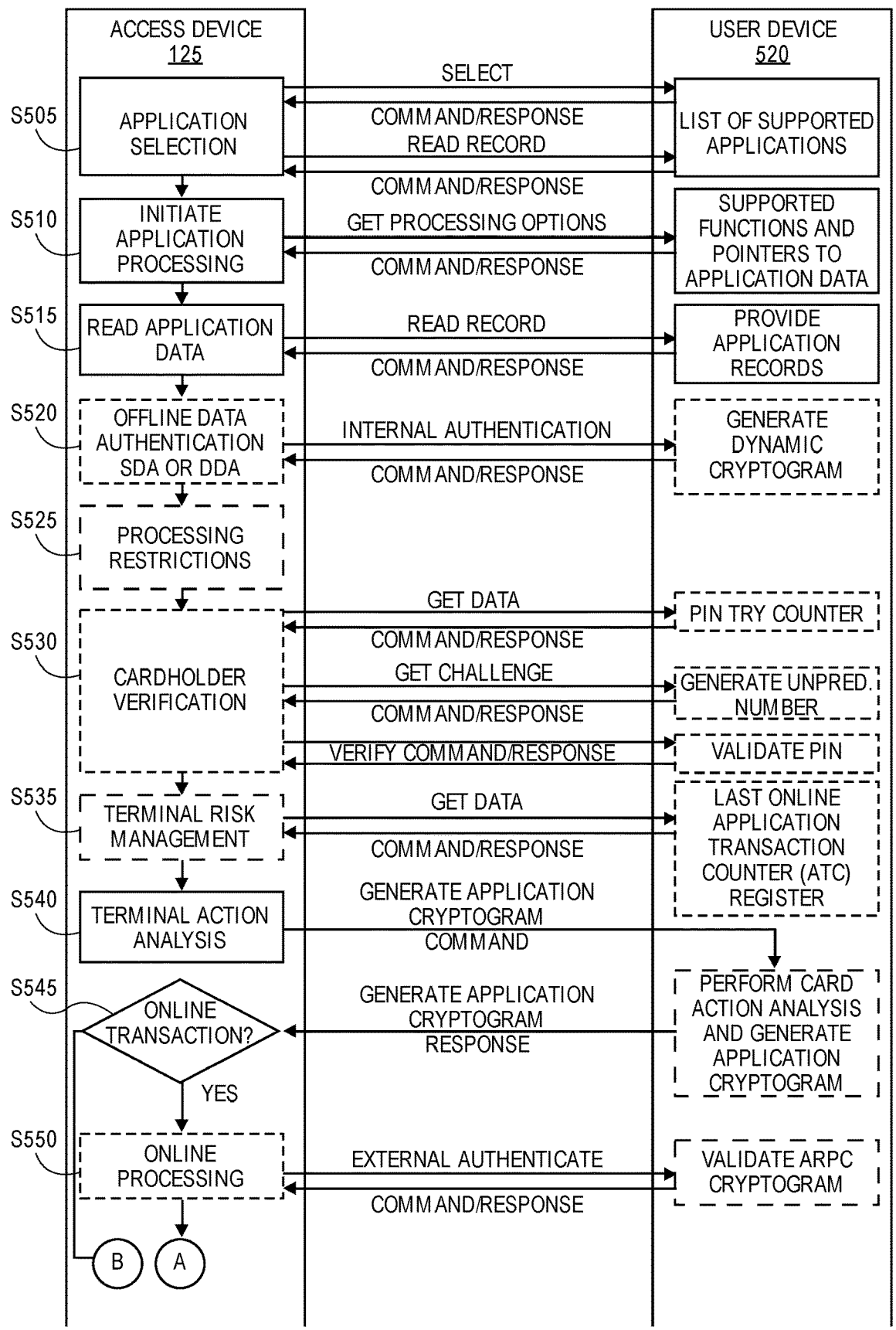
FIGS. 5A-5B show a flow diagram illustrating an example of transaction communications, according to embodiments of the invention.
Figure 5B:
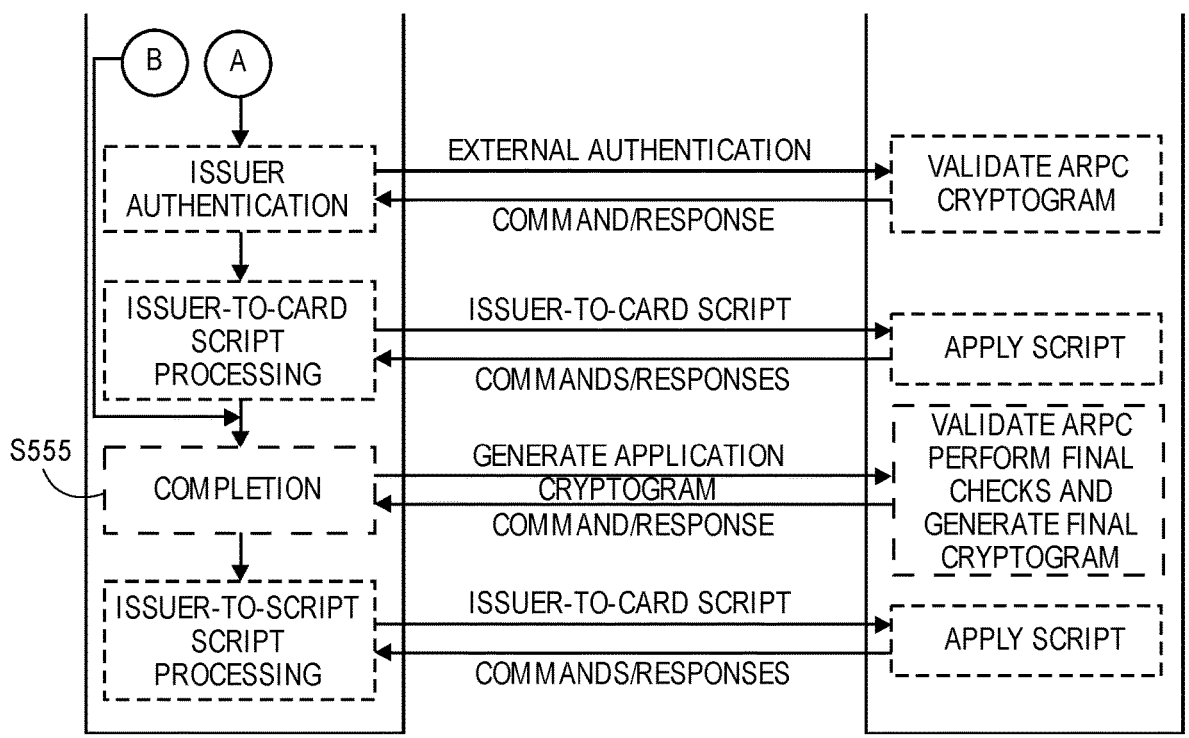

As mentioned above, transaction communications between a simulation device 120 and an access device 125 can include the exchange of several messages (in addition to messages sent to other components in the transaction system). These messages can take the form of APDU (application protocol data unit) messages. FIGS. 5A-5B shows an example APDU message exchange between a transaction device 520 and an access device 125, according to embodiments of the invention.

The below APDU message flow is described for a normal transaction between a normal transaction device 520 and an access device 125. However, embodiments allow the transaction device 520 to be replaced by a simulation device 120. A simulation device 120 can simulate each of the below-described messages sent by the transaction device 520. However, the simulation device 120 may not need to generate these messages. Instead, the simulation device 120 can have a table of predefined input messages and corresponding output messages. The simulation device can match a received command from the access device 125 to a predefined output message, and then send a corresponding output message back to the access device 125.

In some embodiments, a predefined output message sent by the simulation device 120 simulates a normal response expected from a transaction device at that point. In other embodiments, the predefined output message may resemble an the expected response but include missing information or formatting errors. In further embodiments the predefined output message may not resemble an expected response at all. These predefined responses may be used to test the reaction of the access device 125 to errant information.

Continuing with the description of the typical APDU message exchange, when a transaction device 520 contacts (or establishes a contactless communication link) an access device 125, the transaction device 520 and access device 125 are then able to communicate and exchange APDU messages. The messages can be in the form of APDU commands sent from the access device 125 to the transaction device 520, and APDU responses sent from the transaction device 520 to the access device 125. However, it should be understood that other messages, messaging protocols, or formats can be used to exchange the relevant information to conduct the transaction.

At step S505, the access device 125 may perform application selection. For example, the access device 125 may determine which applications are supported by both the transaction device 520 and the access device 125. In some embodiments, when the access device 125 detects the presence of the transaction device 520, the access device 125 may send an available applications request (which may be a "select command") to the user device 115 to request information on which payment applications (e.g., a list of AIDS) may be available at the transaction device 520.

The transaction device 520 may respond by sending an available applications response back to access device 125. The available applications response (which may be a "select response") may include a list of available AIDs (application identifiers).

The access device 125 may then select a suitable application from the list of applications received in the available applications response (e.g., by selecting an AID from the available AIDs). The access device 125 may also send an application selection message (which may be a "read record" or "select AID" command) with the selected AID to the transaction device 520.

The transaction device 520 may then send a request (which may be a "read record response") for transaction data to the access device 125 which may be needed to execute the transaction using the selected application/AID. The request may include a list of transaction data identifiers, and the list can be in the form of a processing options data object list (PDOL).

At step S510, the access device 125 may initiate application processing. For example, the access device 125 may request that the transaction device 520 indicate the data (e.g., a list of files containing the data) to be used for the selected application and the functions supported. In some embodiments, the access device 125 may send a get processing options (GPO) command. The access device 125 may also provide transaction information to the transaction device 520 (e.g., via the GPO command).

The transaction device 520 may then generate dynamic transaction processing information using at least some of the received terminal transaction data, and send (via a "GPO response") a set of transaction processing information to the access device 125. The transaction processing information may include one or more application file locators (AFLs) that can be used as file addresses by access device 125 to read account data stored on transaction device 520.

At step S515, the access device 125 may read application data. For example, the access device 125 may send an account data request (which may be a "read record command") to the transaction device 520 to read account data stored at the transaction device 520.

The transaction device 520 may then send the account data to the access device 125 (e.g., via a "read record response"). The account data may include, for example, track-2 equivalent data (e.g., an account identifier and/or other payment credentials) and the cardholder name, and/or other account related data that is accessible at the AFL location.

One or more steps of authentication and verification can be performed to validate that the transaction can proceed. For example, steps S520-S540 provide various authentication processes. At step S520, the access device 125 may determine whether it should authenticate the transaction device 520 offline. At step S525, the access device 125 may check for processing restrictions. At step S530, the access device 125 may perform cardholder verification. At step S535, the access device 125 may perform terminal risk management (e.g., check for signs of fraud). At step S540, the access device 125 may perform a terminal action analysis. For example, the access device may determine whether the transaction should be approved offline, sent online for authorization, or declined offline.

The access device 125 may then request a cryptogram from the transaction device 520 (e.g., via a generate application cryptogram command). In some embodiments, an authorization request cryptogram (ARQC) may be requested for online authorization, a transaction certificate (TO) may be requested for offline authorization (e.g., already approved offline), and an application authentication cryptogram (AAC) may be requested for a transaction decline or an authorization deferral.

The transaction device 520 may then determine what type of cryptogram to provide to the access device. For example, the transaction device 520 may provide an ARQC to proceed with online authorization. Alternatively, the transaction device 520 may determine that the transaction should be declined, and may return an AAC.

At step S545, the access device 125 may receive the cryptogram from the transaction device 520 and determine whether to authorize the transaction online. In some embodiments, if an ARQC is received, the access device 125 may continue with an online authorization process.

At step S550, having obtained the requisite data, the access device 125 may then process the transaction online. For example the access device 125 may utilize some or all of the obtained data elements (e.g., from the transaction processing information and the account data) to generate a transaction authorization request message to request authorization of the transaction from the issuer (e.g., online authorization).

The access device 125 may send the authorization message to the authorizing entity computer via the transaction processing network for authorization (as explained above with respect to FIG. 1). The access device 125 may receive a response with an authorization result and/or information about transaction processing issues.

At step S555, the access device 125 may complete the transaction communications. This can include providing the authorization result and/or any other transaction processing information to the transaction device 520. The access device 125 may also request a second cryptogram from the transaction device 520 (e.g., using a second generate application cryptogram command). If the transaction was successfully authorized, the access device 125 may indicate so by requesting a TO. Once the transaction device 520 provides the second cryptogram (e.g., via a generate application cryptogram response), it may complete its internal processing and revert to a default state, thereby becoming ready for removal from the access device 125 and ready for a subsequent transaction.

Embodiments allow the simulation device 120 to simulate this entire exchange, as well as intentionally change the information or message format for each step (as well as skip a step). As described above, embodiments advantageously allow the simulation device 120 to send predefined messages based on the information received from the access device 125. As a result, when simulating a certain transaction device, the simulation device 120 may not need to have a copy of that transaction device's actual logic for generating messages. Instead, the simulation device 120 can be preloaded with the type of message that might be sent by that transaction device. From the perspective of the access device 125, the simulation device 120 is operating in the same way as the transaction device. However, the logic and programming of the transaction device may be kept secret and secure, and the simulation device 120 may be sending predefined messages.

Similarly, the simulation device 120 can be loaded with predefined messages that include errors. This allows the simulation device 120 to test the access device's reaction to errant messages. Using predefined messages for this application is particularly useful, as a transaction device's typical logic and programming would need to be altered to create a test scenario with errant data. Extensive human work would be needed to change the logic for each transaction device that the simulation device 120 is simulating.

Each test transaction can include a set of predefined input messages, each of which may be tied to a (same or different) predefined output message. Thus, depending on what input message is received at the simulation device 120, a certain output message is sent back to the access device 125.

As an example, a certain test transaction can have different predefined select responses (see step S505 in FIG. 5A) that can be sent depending on exactly what the access device 125 sends in the select command. If the incoming select command is "00a4040007A0000000031010," the corresponding predefined select response may be "6f098407a00000000310109000." Other select responses may be sent for different select commands (e.g., select commands with different values in one or more select command data fields).

Similarly, if a read record command sent by the access device 120 to the simulation device 120 is "00B2020000," the simulation device 120 may identify that this input calls for a read record command of "702657134761739001010010d20122011." Then, the access device 120 may send a GPO command of "80A80000028300," This GPO command may match a predefined input message, so the simulation device 120 may send a corresponding predefined output message of the GPO response, which may be "800e38000802020010010200180102011."

In some embodiments, a test transaction may correlate multiple input messages with the same predefined output message. For example, the simulation device 120 may respond with the same exact read record response (e.g., the same items listed in a processing options data object list), regardless of which AID is indicated in a read record command. As another example, the test transaction may be configured to test the access device's response to a decline from the transaction device. Accordingly, the simulation device 120 may indicate that the transaction is declined in the generate application cryptogram response regardless of what transaction amount is sent by the access device 125 in the generate application cryptogram command (i.e., the transaction amount may be ignored).

The simulation device 120 may be programmed to group multiple potential input messages together in this manner by ignoring or masking specific data fields in a received message. In one example, the first two characters in the select command may be masked or ignored. As a result, all of the following possible select command messages may be considered the same message by the simulation device 120, since the only difference between them is the first two characters:

00a4040007A0000000031010
01a4040007A0000000031010
02a4040007A0000000031010
03a4040007A0000000031010

In this example, the same predefined output message (which may be "6f098407a00000000310109000") is sent regardless of which of the above messages are received.

Figure 6:
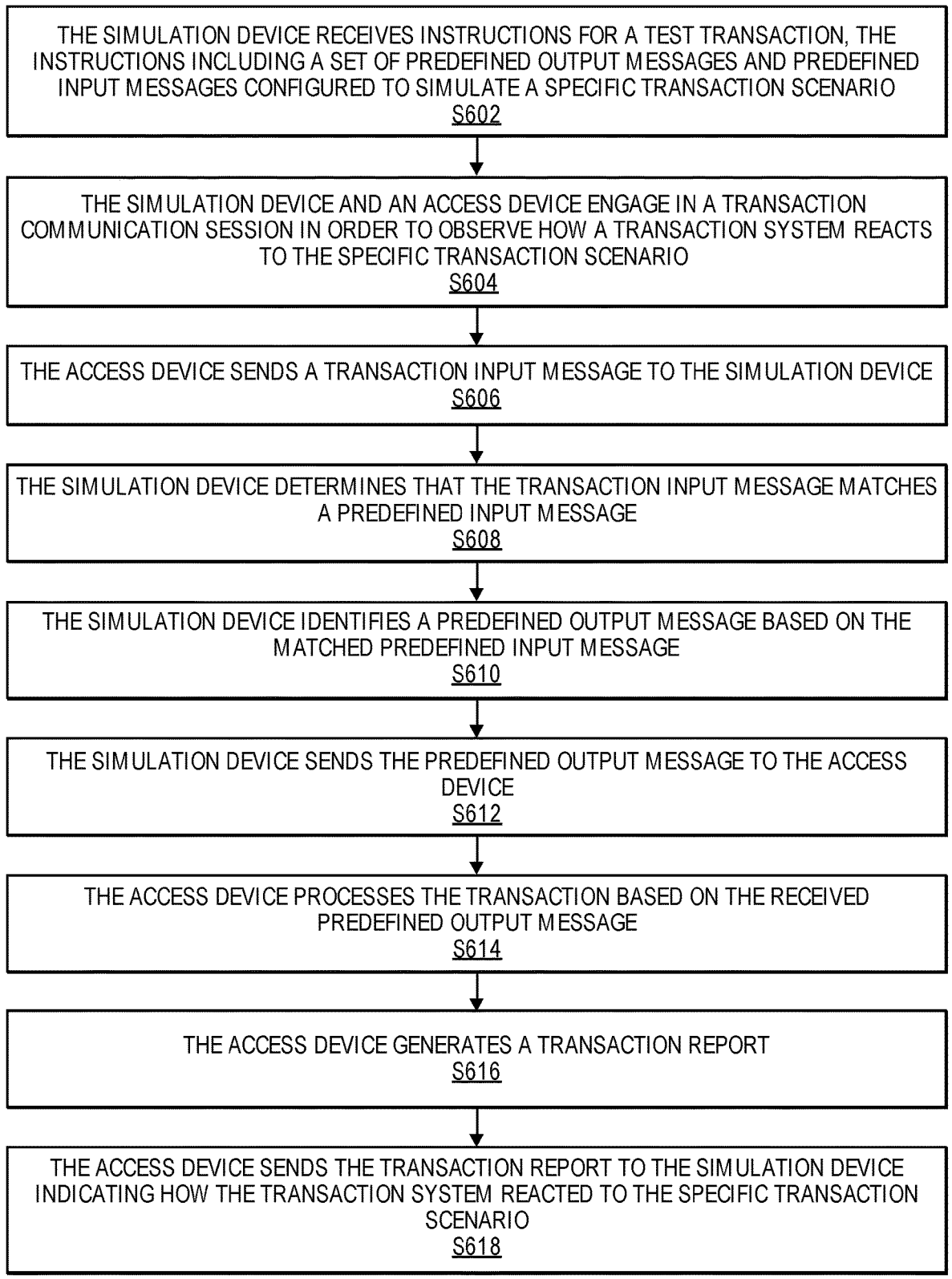
FIG. 6 shows a flow diagram illustrating an exemplary transaction simulation process, according to embodiments of the invention.

A method 600 according to embodiments of the invention can be described with respect to FIG. 6. Some elements in other Figures are also referred to. The steps shown in the method 600 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

In the following flow, a simulation device 120 interacts with an access device 125 for a transaction. However, an access device may be one type of computing device, and the simulation device 120 may be able to interact in this manner with any other suitable type of computing device. Any computing device that interacts with another device (e.g., a transaction device) can be tested by the simulation device 120 to determine how the computing device reacts to different messages and scenarios. For example, a computing device that is a part of a geo-location system can communicate with other similar devices to locate a mobile device. This type of computing device can be tested with the simulation device 120 to observe how it communicates with other computing devices and a mobile device. More specifically, the simulation device 120 can test whether the computing device correctly calculates a distance to a mobile device based on over-the-air communications, as well as whether the computing device provides the distance information when prompted.

Additionally, a simulation device 120 may be able to interact with an access device 125 to simulate one or more test transactions. The following flow describes testing different payment transaction scenarios. However, any other suitable type of transaction can be tested, such as an access transaction or an identity verification transaction.

The simulation device 120 may be located at a merchant storefront or other field-testing location. A testing computer 170 with updated and current test transaction instructions may be located in a central testing facility away from the simulation device 120. However, the testing computer 170 may be able to send new or updated test transaction information to the simulation device 120.

At step S602, the simulation device 120 may send a request to the testing computer 170 for some or all of the test transaction data. This request may establish a communications session between the simulation device 120 and the testing computer 170. The testing computer 170 may then provide instructions for one or more test transactions to the simulation device 120. The instructions for each test transaction can include a set of predefined output messages and a set of predefined input messages, where each predefined input message is associated with a specific predefined output message. Each transaction can be configured to simulate a specific transaction scenario.

Having received the test transaction instructions, the simulation device 120 can be ready for conducting one or more test transactions. The simulation device 120 may inform the user 110 that the simulation device 120 is ready for testing, and may prompt the user 110 to insert the simulation device 120 into the access device 125. The user 110 may then present the simulation device 120 to an access device 125 at a merchant storefront for a test transaction. The user 110 may select one or more test transactions to conduct, or the simulation device 120 may automatically conduct a set of test transactions indicated by the testing computer 170.

At step S604, the simulation device 120 may establish communication with an access device 125 (e.g., via contact or short-range contactless communication). A transaction communication session may be initiated, during which the simulation device 120 may execute instructions for a first test transaction. The first test transaction may be designed to simulate a first transaction scenario, and to test the access device's reaction to the first transaction scenario.

During the transaction communication session, the access device 125 may send several messages to the simulation device 120, and the simulation device 120 may respond with several messages to the access device 125. These messages can include APDU commands and responses. Steps S606-S612 describe one set of exchanged messages. However, several iterations of message exchange can take place.

At step S606, the access device 125 may send a transaction input message to the simulation device 120. The transaction input message may be an APDU command, such as a select command, a read record command, a GPO command, a get data command, a generate application cryptogram command, or any other suitable message.

At step S608, the simulation device 120 may receive the transaction input message and compare the transaction input message to the predefined input messages for the current test transaction in order to identify any possible matches. The simulation device 120 may then determine that the transaction input message matches a predefined input message.

At step S610, the simulation device 120 can identify a predefined output message based on the matched predefined input message. For example, the predefined input message may be associated with a certain predefined output message.

At step S612, the simulation device 120 may send the predefined output message to the access device 125.

At step S614, the access device 125 can continue with processing the transaction based on the received output message. For example, the access device 125 may still need further information from the simulation device 120, so the access device 125 can send one or more additional messages to the simulation device 120. Once the access device 125 receives all the necessary transaction information, the access device 125 may use the information to send an authorization request message to an issuer. Alternatively, the test transaction may be declined and stop at any time (e.g., during an test transaction that includes intentionally incorrect output messages).

During transaction processing and message exchanges, the access device 125 may keep track of any processing errors, delays, or unusual circumstances. For example, the access device 125 may log unexpected or missing information from the simulation device 120, as well as what the access device 125 did in response. The access device 125 may also record information about how the authorization request message sent to the issuer was processed.

At step S616, the access device 125 may generate a transaction report for the first transaction. The transaction report can indicate whether or not the transaction was authorized. The transaction report can also include a communication log and information about how the transaction was processed, such as how the entire transaction system reacted to the specific transaction scenario, whether transaction processing was normal, and/or if there were unusual circumstances or errors. Each entity in the system (e.g., the issuer, transaction processing network, etc.) may inform the access device 125 if any processing issues occurred (e.g., via an authorization response message).

At step S618, the access device 125 may send the transaction report to the simulation device 120. The access device 125 can prompt the user 110 to present (e.g., tap or insert) the simulation device 120 to the access device 125 again to receive the transaction report. As a result, the simulation device 120 may obtain detailed information about how the transaction was processed from each component in the transaction system.

In some embodiments, the simulation device 120 may also create its own transaction report for the first test transaction. For example, the simulation device 120 may note how the access device 125 responded to each simulation device response message (e.g., what information the access device 125 subsequently provided and/or requested). The simulation device 120 may also track any delays, unexpected events, inappropriate access device 125 actions, and transaction successes/failures.

Once the test transaction is completed, one or more additional steps can take place. For example, in some embodiments, the simulation device 120 may send the transaction report and any other suitable information to the testing computer 170. The testing computer 170 may receive this transaction report as well as other transaction reports for the same test transaction from other simulation devices in other locations. As a result, the testing computer 170 can have a large amount of data for identifying trends and possible systemic errors.

Additionally, the user 110 may review the transaction report and identify any possible local errors at the access device 125. For example, the user 110 may view an access device 125 display that indicates a transaction approval, decline, or other error message. The user 110 may be able to take immediate action to fix or adjust the access device 125, changing settings or fixing program errors.

The user 110 may also review transaction logs stored locally at other components in the transaction system (e.g., the issuer computer, transaction processing computer, merchant computer, or acquirer computer). For example, the user 110 may remotely login to these computers (e.g., via the user device 115) and access a transaction database for each computer. The user 110 may thereby be able to locate more information about transaction processing issues, determine whether the transaction data was correctly processed at each point in the network, and/or determine whether the authorization response messages and authorization request messages were correctly routed to and from the issuer computer.

Having completed the first test transaction, the simulation device 120 may then initiate a second transaction communication session with the access device 125 in order to run a second test transaction. The user 110 may select the next test transaction, or the next queued transaction can automatically initiate (e.g., without removing the simulation device 120 from the access device 125). The process can be repeated any number of times until all of the desired test transactions have been completed. A number of test transactions can be performed that simulate different transaction scenarios and/or different transaction devices.

Accordingly, the simulation device 120 can simulate a specific transaction scenario as well as the responses of a specific transaction device that is not actually involved in the transaction. The simulation device 120 can accomplish this simulation without needing the actual logic used in the actual transaction device, as the simulation device 120 can instead send predefined responses that are consistent with the typical use of the transaction device (because they were designed to simulate the transaction device).

In some embodiments, the user device 115 may serve as an intermediary between the testing computer 170 and the simulation device 120. For example, at step S602, the testing computer 170 may provide the test transaction instructions to the user device 115, which can in turn provide the test transaction instructions to the simulation device 120. For example, the user 110 may physical contact the simulation device 120 to the user device 115 for loading instructions. Additionally, after receiving a transaction report from the access device 125, the simulation device 120 may provide the transaction report to the user device 115, which can then forward the reports to the testing computer 170.

As explained above, the test transactions can simulate a number of different transaction scenarios. This includes transaction scenarios where a transaction device is behaving unusually (to observe how the access device 125 reacts). While many transaction scenarios are possible, some specific examples will now be described for illustrative purposes.

Test transactions can be designed to test whether different types of transaction devices work for a given access device 125 at a merchant location. For example, a first test transaction can simulate a VISA credit card, and therefore the select response carries a VISA AID (application identifier). A second test transaction for simulating a different type of credit card has a different type of AID.

Another test transactions is designed to make sure an access device 125 reacts appropriately for transaction devices that are only meant to work for online authorization. Accordingly, the test transaction sends an ARQC in the generate application cryptogram response. Another test transaction for testing offline authorization only cards will send a TC in the generate application cryptogram response.

A test transactions that is designed to test whether a tokenized transaction is processed appropriately can send a payment token in the read record response. A test transaction designed to test how a transaction network handles a certain type of cryptogram (e.g., cryptogram version number 22, or cryptogram version number 18) can send a "22" or "18" in the CVN field of the issuer application data (e.g., in a generate application cryptogram response).

Additional test transactions can be designed to target specific transaction processing functions at the acquirer computer, the merchant computer, the transaction processing computer, and/or the issuer computer.

Other test transactions can be designed to simulate negative test cases (e.g., test transactions with intentional errors). It is advantageous to know how the access device 125 (or other parts of the transaction system) react when a transaction device provides bad information. Negative test cases provide this information and enable users to make changes if needed. The following are examples of negative test cases.

As a first example, a test transaction is designed to test the access device's response when a transaction device fails to provide a currency code. When simulating this scenario, the simulation device 120 sends mostly expected and normal APDU responses. However, one specific response message, the "read record" response, is missing the currency code data field.

For example, a normal read record response may be constructed as:
702B5713476173900101001d20122011234599999991
 f5f200e4e616d65306 9
 6e205265636f72649f420208409000

However, the read record response sent during the test transaction may be different in that it does not include the data field that is struck-through here:
70265713476173900101001d20122011234599999991
 f5f200e4e616d65306 9
 6e205265636f72649000

Here, "9f42" (beginning of missing data) is a tag indicating a currency code follows, "02" is a length of the following currency code, and "0840" (remainder of missing data) is the currency code.

The access device 125 may be designed such that it can continue with transaction processing as normal, even if this currency code is missing. Thus, this test transaction can be used to determine whether or not the access device 125 is actually able to proceed as intended when the currency code was not provided. It is possible that the access device 125 will instead reject the transaction, stall until a time-out occurs, experience a processing delay, or otherwise behave in an undesired manner. It is also possible that other components down the line (e.g., the issuer computer or transaction processing computer) will have problems. The user 110 can observe any issues and take necessary corrective measures.

As a second example, a test transaction is designed to test the access device's response when a transaction device provides an invalid SDAD (Signed Dynamic Application Data). Similarly, when simulating this scenario, the simulation device 120 sends mostly expected and normal APDU responses. However, one specific response message, the "get processing options" response, has a value in SDAD data field with an incorrect length, incorrect format, or an otherwise inappropriate value.

For example, a normal SDAD data field may be constructed as "9F4B404B54 . . . ." However, an SDAD field could be wrongly encoded, and thereby be changed and miss the two bytes "4B54," such that the SDAD data field in the test transaction's GPO response is "9F4B3D, . . . ."

Again, it may be desirable for the access device 125 (and other parts of the transaction system) to react to this situation in a certain way. For example, it may be best for the access device 125 to continue with the transaction, to decline the transaction, to ask for more information from the simulation device 120, to flag the incorrect SDAD in an authorization request message, or to take any other suitable action. The simulation device 120 or other component in the transaction system may log what happens, and the user 110 and/or testing computer 170 can observe the results.

A normal transaction device cannot be used to run these negative test cases, as it would behave normally (e.g., it would actually send the currency code and a valid SDAD). To run these test transactions without the simulation device, a special transaction device with manipulated logic (for not sending a currency code or for sending an invalid SDAD) would have to be created. Thus, it is advantageous to run a negative test case with a simulation device 120 as described above, as it is less laborious to design a predefined output message with a missing currency code. Especially when the negative test case is being tested for multiple types of transaction devices.

Embodiments of the invention also enable the user 110 to control the simulation device 120 in several ways. For example, the user 110 can create a specific test transaction instead of receiving all test transaction instructions from the testing computer 170. The user 110 can program the simulation device 120 directly on a simulation device 120 interface, or indirectly through the user device 115. The interface may include several options, such as a "select" command, a "set" command, a "read log" command, a "program" command, and a "switch out" command.

The select command allows the user 110 to select a test transaction to adjust or to create a new test transaction. Then the user 110 can also specify which APDU message to augment.

The program command allows the user 110 to specify how an APDU message is changed (e.g., what data fields to augment). For example, the user 110 can specify the predefined output messages to send for different input messages. More broadly, the user 110 can specify messages to remove, communication delays to incorporate, or any other suitable part of the test transaction to change.

Several set commands enable the user 110 to set various simulation device 120 parameters. For example, one set command switches the simulation device 120 (e.g., an application on a mobile device) from a programmable mode to a testing mode, such that a test can be started. Other set command can be used to clear previous test transaction instructions, enable transaction communication logging, or disable communication logging.

The switch out command allows the user 110 to switch the simulation device 120 out of the testing mode and back to the programmable mode.

The read log command allows the user 110 to obtain and view a transaction report or log from a previous testing session (e.g., provided communication logging is enabled during the set command). The user 110 can then review results from the previous test.

Embodiments of the invention have a number of advantages. For example, in embodiments of the invention, a single simulation device can be used to test how an access device reacts to any suitable number of different transaction devices and transaction scenarios. Thus, there is no need to physically send a plurality of different sample transaction devices for testing, as all the tests can be conveniently conducted using the single simulation device.

Also, when new transaction devices are made or other updates take place, updated test transaction instructions can be sent to a remotely-located simulation device that is already in the field. As a result, additional physical devices need not be distributed. Additionally, the most up-to-date transaction devices and test cases can be simulated immediately, without waiting for any physical distributions.

Embodiments of the invention also advantageously simplify the testing process, so that a skilled technical worker is not needed for conducting the test transactions. The simulation device can be loaded with all necessary information for running one or more test transactions and automatically conduct the test transactions when inserted into (or placed near) an access device. In other words, the user can facilitate all the test by simply placing the simulation device at the access device. The simulation device can also log information about each test, and forward the data to a central testing computer. With data from multiple simulation devices in a multiple places, it is easier to determine problems for a transaction device as well as develop possible corrections.

Embodiments of the invention further advantageously allow a transaction device to be simulated without using the transaction device logic, programming, or other configurations. Instead, predefined output messages (which are typically public and not confidential) can be built to simulate a message that would be sent by that transaction device. In other words, the simulation device can simulate the functionality of the transaction device (from the perspective of the access device) and provide feedback about how that transaction device would work without exposing the transaction device logic. As a result, security is improved and cards with confidential logic can be tested.

Embodiments of the invention also advantageously allow negative test cases to be conducted. Faulty transaction devices can be tested without having to actually create a faulty transaction device (which would involve changing the transaction device's logic and programming), as a set of predefined messages can be used instead of faulty device logic. This opens up a number of newly possible test cases, and thereby provides new information about how a transaction system functions. Instead of just making sure that a transaction device works properly, the outcomes of defective transaction devices can be also be observed. Previously unknown errors and inefficiencies can be identified and resolved.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
engaging, by a simulation device, in a transaction communication session with a computing device in order to observe how a transaction system reacts to a specific transaction scenario, the simulation device storing instructions for a test transaction, the instructions including a set of predefined output messages and predefined input messages configured to simulate the specific transaction scenario;
receiving, by the simulation device, a transaction input message from the computing device;
determining, by the simulation device, that the transaction input message matches a predefined input message;
identifying, by the simulation device, a predefined output message based on the matched predefined input message; and
sending, by the simulation device, the predefined output message to the computing device, wherein a transaction report is generated that indicates how the computing device reacted to the specific transaction scenario.

2. The method of claim 1, wherein the predefined output message includes an intentional error in formatting or content.

3. The method of claim 2, wherein the transaction system reacts by rejecting the transaction due to the error in formatting or content.

4. The method of claim 1, wherein the set of predefined output messages simulates a certain type of transaction device.

5. The method of claim 1, further comprising:
receiving, at the simulation device, a plurality of instruction sets, each instruction set corresponding to a different test transaction for a different transaction scenario, wherein a plurality of test transactions are conducted in order to test each transaction scenario.

6. A simulation device comprising:
a processor; and
a computer readable medium, the computer readable medium comprising code, executable by the processor, for implementing a method comprising:
engaging in a transaction communication session with a computing device in order to observe how a transaction system reacts to a specific transaction scenario, the simulation device storing instructions for a test transaction, the instructions including a set of predefined output messages and predefined input messages configured to simulate the specific transaction scenario;
receiving a transaction input message from the computing device;
determining that the transaction input message matches a predefined input message;
identifying a predefined output message based on the matched predefined input message; and
sending the predefined output message to the computing device, wherein a transaction report is generated that indicates how the computing device reacted to the specific transaction scenario.

7. The simulation device of claim 6, wherein the predefined output message includes an intentional error in formatting or content.

8. The simulation device of claim 7, wherein the transaction system reacts by rejecting the transaction due to the error in formatting or content.

9. The simulation device of claim 6, wherein the set of predefined output messages simulates a certain type of transaction device.

10. The simulation device of claim 6, wherein the method further comprises:
receiving a plurality of instruction sets, each instruction set corresponding to a different test transaction for a different transaction scenario, wherein a plurality of test transactions are conducted in order to test each transaction scenario.

11. A method comprising:
engaging, by a computing device, in a transaction communication session with a simulation device;
sending, by the computing device, a transaction input message to the simulation device, wherein the simulation device determines that the transaction input message matches a predefined input message, and wherein the simulation device identifies and transmits a predefined output message based on the matched predefined input message;
receiving, by the computing device, the predefined output message from the simulation device, the predefined output message being part of a set of predefined output messages configured to simulate a specific transaction scenario; and
processing, by the computing device, the transaction based on the received predefined output message, wherein a transaction report is generated that indicates how the computing device reacted to the specific transaction scenario.

12. The method of claim 11, wherein the predefined output message includes an intentional error in formatting or content.

13. The method of claim 12, wherein the transaction system reacts by rejecting the transaction due to the error in formatting or content.

14. The method of claim 11, wherein the set of predefined output messages simulates a certain type of transaction device.

15. The method of claim 11, wherein the simulation device includes a plurality of instruction sets, each instruction set corresponding to a different test transaction for a different transaction scenario, and wherein the method further comprises:
for each transaction scenario:
engaging in a transaction communication session with the simulation device.

16. A computing device comprising:
a processor; and
a computer readable medium, the computer readable medium comprising code, executable by the processor, for implementing a method comprising:

engaging in a transaction communication session with a simulation device;

sending a transaction input message to the simulation device, wherein the simulation device determines that the transaction input message matches a predefined input message, and wherein the simulation device identifies and transmits a predefined output message based on the matched predefined input message;

receiving the predefined output message from the simulation device, the predefined output message being part of a set of predefined output messages configured to simulate a specific transaction scenario; and processing the transaction based on the received predefined output message, wherein a transaction report is generated that indicates how the computing device reacted to the specific transaction scenario.

17. The computing device of claim 16, wherein the predefined output message includes an intentional error in formatting or content.

18. The computing device of claim 17, wherein the transaction system reacts by rejecting the transaction due to the error in formatting or content.

19. The computing device of claim 16, wherein the set of predefined output messages simulates a certain type of transaction device.

20. The computing device of claim 16, wherein the simulation device includes a plurality of instruction sets, each instruction set corresponding to a different test transaction for a different transaction scenario, and wherein the method further comprises:

for each transaction scenario:
    engaging in a transaction communication session with the simulation device.

* * * * *